United States Patent
Challenger et al.

(10) Patent No.: US 9,396,031 B2
(45) Date of Patent: Jul. 19, 2016

(54) DISTRIBUTED UIMA CLUSTER COMPUTING (DUCC) FACILITY

(71) Applicant: International Business Machines Corporation, Armonk, NY (US)

(72) Inventors: James R. Challenger, Garrison, NY (US); Jaroslaw Cwiklik, Shrub Oak, NY (US); Louis R. Degenaro, White Plains, NY (US); Edward A. Epstein, Putnam Valley, NY (US); Burn L. Lewis, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 14/039,446

(22) Filed: Sep. 27, 2013

(65) Prior Publication Data

US 2015/0095917 A1    Apr. 2, 2015

(51) Int. Cl.
*G06F 9/50* (2006.01)
*G06F 9/48* (2006.01)
*G06F 9/54* (2006.01)

(52) U.S. Cl.
CPC ............ *G06F 9/5027* (2013.01); *G06F 9/4843* (2013.01); *G06F 2209/504* (2013.01); *G06F 2209/5011* (2013.01); *G06F 2209/5013* (2013.01); *G06F 2209/5014* (2013.01); *Y02B 60/142* (2013.01)

(58) Field of Classification Search
None
See application file for complete search history.

(56) References Cited

U.S. PATENT DOCUMENTS

| | | | |
|---|---|---|---|
| 7,139,752 B2 | 11/2006 | Broder et al. | |
| 7,849,048 B2 | 12/2010 | Langseth et al. | |
| 8,346,563 B1 | 1/2013 | Hjelm et al. | |
| 8,424,003 B2 | 4/2013 | Degenaro et al. | |
| 2007/0011281 A1* | 1/2007 | Jhoney et al. | 709/220 |
| 2007/0236708 A1* | 10/2007 | Jahn et al. | 358/1.6 |
| 2007/0283351 A1* | 12/2007 | Degenaro et al. | 718/100 |
| 2009/0049550 A1* | 2/2009 | Shevchenko | 726/23 |
| 2010/0049590 A1 | 2/2010 | Anshul | |
| 2010/0094803 A1 | 4/2010 | Yamakawa et al. | |
| 2012/0124584 A1* | 5/2012 | Addala et al. | 718/102 |
| 2013/0007033 A1 | 1/2013 | Brown et al. | |
| 2013/0204922 A1* | 8/2013 | El-Bakry et al. | 709/202 |

OTHER PUBLICATIONS

Balasubramaniyan et al, An Architecture for Intrusion Detection using Autonomous Agents, Computer Security Applications Conference, 1998, Proceedings. 14th Annual.*
The DUCC Team, "Distributed UIMA Cluster Computing", https://cwiki.apache.org/confluence/download/attachments/30751207/duccbook-0.8.0.pdf?version=1&modificationDate=1380124495217, Sep. 23, 2013, pp. 1-162.
Mell et al., "The NIST Definition of Cloud Computing", Version 15, Oct. 7, 2009.

* cited by examiner

*Primary Examiner* — Lewis A Bullock, Jr.
*Assistant Examiner* — Bruce S Ashley
(74) *Attorney, Agent, or Firm* — Reza Sarbakhsh; William Stock

(57) ABSTRACT

A system for processing analytics on a cluster of computing resources may receive a user request to process a Job, Service or Reservation, and may include an Orchestrator, Resource Manager, Process Manager, and one or more Agents and Job Drivers, which together deploy the Job onto one or more nodes in the cluster for parallelized processing of Jobs and their associated work items.

20 Claims, 6 Drawing Sheets

Modules/Sub-Modules of Select DUCC System 200 Daemons/Components

DISTRIBUTED UIMA CLUSTER COMPUTING (DUCC) FACILITY

STATEMENT REGARDING FEDERALLY SPONSORED RESEARCH OR DEVELOPMENT

This invention was made with Government support under Contract No. 90TR0002/01 (National Institute of Health). The Government has certain rights in this invention.

FIELD

The present application relates generally to information processing in a distributed computing environment through managed use of distributed computational devices in a network, and more particularly to an Unstructured Information Management Architecture (UIMA).

BACKGROUND

An Unstructured Information Management Architecture (UIMA) refers to a software system that provides large-scale analysis of unstructured data to discover useful information. The UIMA architecture includes a set of three frameworks: the Java Framework, the C++ Framework, and the UIMA Asynchronous Scaleout (UIMA-AS) Framework. The frameworks define a series of interfaces and manage a variety of components and data flows between those components. The components may have different functionalities in analyzing unstructured data. For example, components analyzing unstructured text may include a language identification component, a language specific segmentation component, a sentence boundary detection component, and an entity detection component (an entity may be, for example, a natural person, a geographical place, etc.). The UIMA may be deployed on a cluster of networked nodes, with UIMA having the capability to wrap its components as network services scaled on large volumes by replicating processing pipelines over the cluster.

BRIEF SUMMARY

According to an aspect of the disclosed invention, a method for processing UIMA analytics on a cluster of computing nodes may present a user with a user interface to process job requests, and orchestrate deployment and processing of a first job and a set of work items. The first job may have a state and includes a collection reader and a plurality of analysis engines. The orchestration may include managing a set of processes (inclusive of the orchestration); receiving a request from a user to process the first job, deploying the first job onto a set of selected nodes in the cluster of computing nodes, managing processing of the first job, and monitoring the state of the first job and making the state accessible to other processes.

The method may also manage a plurality of constrained computing resources by allocating the plurality of constrained resources in the cluster for processing of the first job and a plurality of additional jobs.

The method may also manage processing of the plurality of work items by the plurality of analysis engines of the first job.

The method may further generate an agent on each node in the set of selected nodes, each agent deploying, monitoring, and controlling a plurality of processes supporting the first job on the node, and publishing a corresponding node inventory and a node metrics report.

The method may further provide a plurality of job drivers for the first job, the plurality of job drivers fetching the plurality of work items of the first job and dispatching the fetched work items to the one or more analysis engines of the first job for processing.

The method may further process the first job and its work items.

According to a further aspect of the disclosed invention, a system for processing UIMA analytics on a cluster of computing nodes may include a first node, the first node being a computer having a processor and a computer-readable storage device, and a program embodied on the storage device for execution by the processor. The program may have a plurality of program modules, as follows. There may be a user interface module to permit a user to request processing a job. There may be an orchestrator module to receive a request from the user to process a first job and a set of work items, where the first job has a state and includes a collection reader and a plurality of analysis engines. The orchestrator module may deploy the first job onto a set of selected nodes that may include the first node and/or a plurality of additional nodes in the cluster for processing, and manage the processing; and it may monitor the state of the first job and make the state accessible to the plurality of program modules.

The system may also include a resource manager module to allocate a plurality of constrained resources in the cluster of computing resources for processing the first job and a plurality of additional jobs.

The system may also include a process manager module to monitor and control the plurality of analysis engines.

The system may also include an agent module to generate an agent for the set of selected nodes where the first job is deployed, wherein each agent deploys, monitors and controls a plurality of processes supporting the first job on the node, and publishes a corresponding node inventory report and a node metrics report.

The system may also include a plurality of job driver modules to fetch the plurality of work items of the first job, and dispatch the fetched work items to the plurality of analysis engines of the first job for processing.

According to a further aspect of the disclosed invention, a computer program product for processing UIMA analytics on a cluster of computing nodes, includes a computer-readable storage medium having program code embodied therewith. The program code is readable/executable by a processor of a computer to perform a method.

The method of the computer program product may present a user, by the processor, with a user interface to process job requests. It may further orchestrate deployment and processing of a first job and a set of work items, by the processor, where the first job has a state and includes a collection reader and a plurality of analysis engines. The orchestration may include: receiving a request from a user, by the processor, to process the first job, deploying the first job, by the processor, onto a set of selected nodes in the cluster of computing nodes, managing processing of the first job, and monitoring, by the processor, the state of the first job and making the state accessible to other processes.

The method of the computer program product may also manage a plurality of constrained computing resources, by the processor, by allocating the plurality of constrained resources in the cluster for processing of the first job and a plurality of additional jobs.

The method of the computer program product may also manage, by the processor, processing of the plurality of work items by the plurality of analysis engines of the first job.

The method of the computer program product may generate an agent, by the processor, on each node in the set of selected nodes, each agent deploying, monitoring, and controlling a plurality of processes supporting the first job on the node, and publishing a corresponding node inventory and a node metrics report.

The method of the computer program product may provide, by the processor, a plurality of job drivers for the first job, the plurality of job drivers fetching the plurality of work items of the first job and dispatching the fetched work items to the one or more analysis engines of the first job for processing.

The method of the computer program product may also process the first job and its work items, by the processor.

Further features as well as the structure and operation of various embodiments are described in detail below with reference to the accompanying drawings. In the drawings, like reference numbers indicate identical or functionally similar elements.

DETAILED DESCRIPTION

Distributed UIMA Cluster Computing (DUCC) is a cluster management system providing tooling, management, and scheduling facilities to automate the scale-out of applications written to the UIMA framework. The DUCC system defines a formal job model that closely conforms to a standard UIMA pipeline. Around this job model, DUCC provides cluster management services to automate the scale-out of UIMA pipelines over computing clusters. Embodiments of DUCC may include, without limitation, a software, system, or computer program product implementation. One or more embodiments of the disclosed invention are set forth in Challenger, et al., Distributed UIMA Cluster Computing, September 2013, which is incorporated herein by reference in its entirety. Nothing stated therein shall be construed to limit the scope of the disclosed invention.

Figure 1:
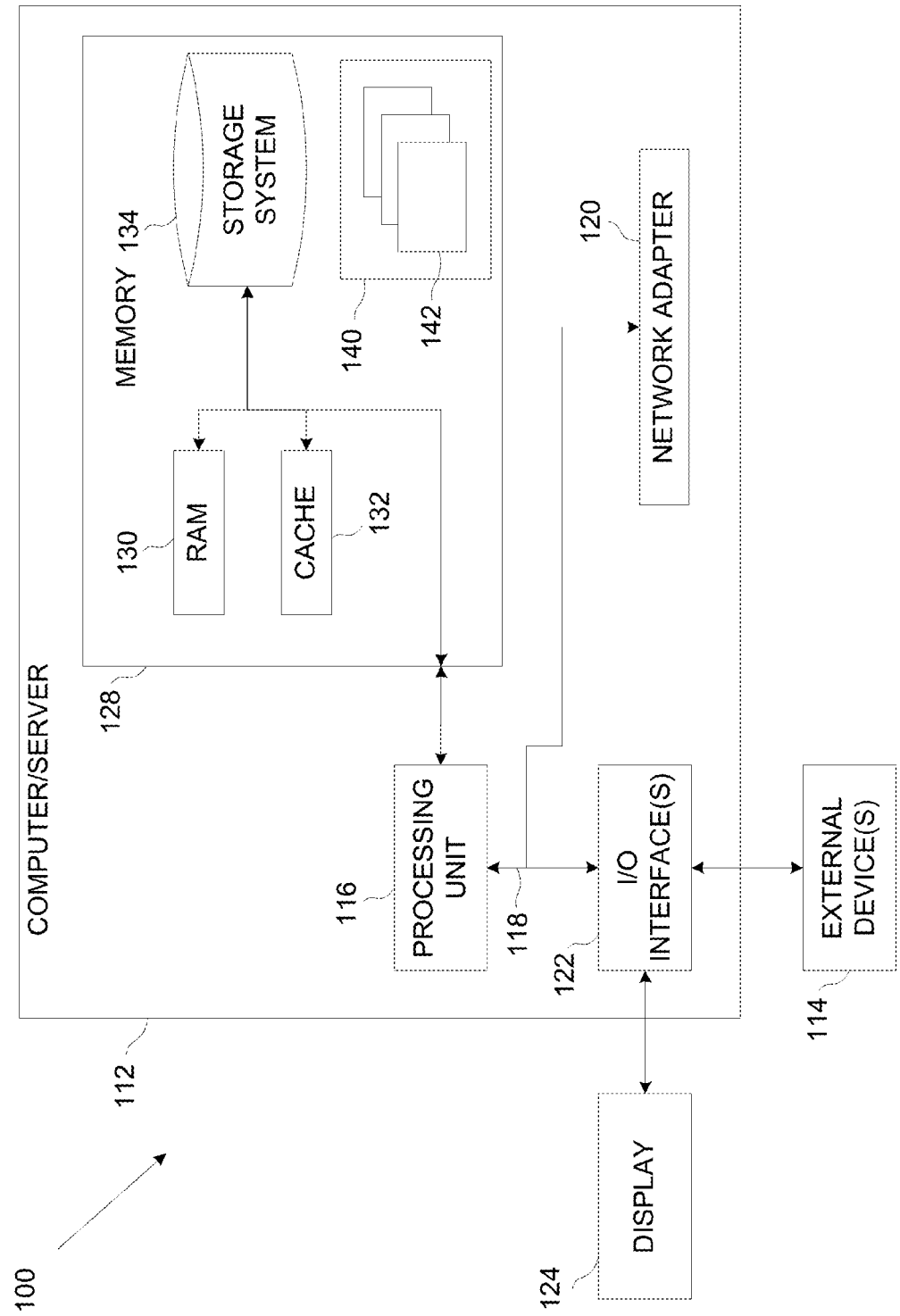
FIG. 1 is a schematic block diagram depicting a computer system according to an aspect of the disclosed invention.

Referring to FIG. 1, a schematic of an exemplary computing system is shown. The computer system 100 is one example of a suitable computer system and is not intended to suggest any limitation as to the scope of use or functionality of embodiments of the invention described herein.

In the computer system 100, shown in FIG. 1, a computer/server 112 is operational with numerous other general purpose or special purpose computing system environments or configurations. Examples of well-known computing systems, environments, and/or configurations that may be suitable for use with the computer/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer/server 112 may be described in the general context of computer system-executable instructions, such as program modules, being executed by the computer system 100. Generally, program modules may include routines, programs, objects, components, logic, data structures, and so on that perform particular tasks or implement particular abstract data types. The computer/server 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer/server 112 in the computer system 100 is shown in the form of a general-purpose computing device. The components of the computer/server 112 may include, but are not limited to, one or more processors or processing units 116, a system memory 128, and a bus 118 that couples various system components including the system memory 128 to the processor 116.

The bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer/server 112 typically includes a variety of computer system readable media. Such media may be any available media that is accessible by the computer/server 112, and it includes both volatile and non-volatile media, removable and non-removable media.

The system memory 128 can include computer system readable media in the form of volatile memory, such as random access memory (RAM) 130 and/or cache memory 132. The computer/server 112 may further include other removable/non-removable, volatile/non-volatile computer system storage media. By way of example only, a storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 118 by one or more data media interfaces. As will be further depicted and described below, the memory 128 may include at least one program product having a set (e.g., at least one) of program modules that are configured to carry out the functions of embodiments of the invention.

A program/utility 140, having a set (at least one) of program modules 142, may be stored in the memory 128 by way of example, and not limitation, as well as an operating system, one or more application programs, other program modules, and program data. Each of the operating system, one or more application programs, other program modules, and program data or some combination thereof, may include an implementation of a networking environment. The program modules 142 generally carry out the functions and/or methodologies of embodiments of the invention as described herein.

The computer/server 112 may also communicate with one or more external devices 114 such as a keyboard, a pointing device, a display 124, etc.; one or more devices that enable a user to interact with the computer/server 112; and/or any devices (e.g., network card, modem, etc.) that enable the computer/server 112 to communicate with one or more other computing devices. Such communication can occur via Input/Output (I/O) interfaces 122. Still yet, computer the system/server 112 can communicate with one or more networks such as a local area network (LAN), a general wide area network (WAN), and/or a public network (e.g., the Internet) via a network adapter 120. As depicted, the network adapter 120 communicates with the other components of the computer/server 112 via the bus 118. It should be understood that although not shown, other hardware and/or software components could be used in conjunction with the computer/server 112. Examples, include, but are not limited to: microcode, device drivers, redundant processing units, external disk drive arrays, RAID systems, tape drives, and data archival storage systems, etc.

Figure 2A:
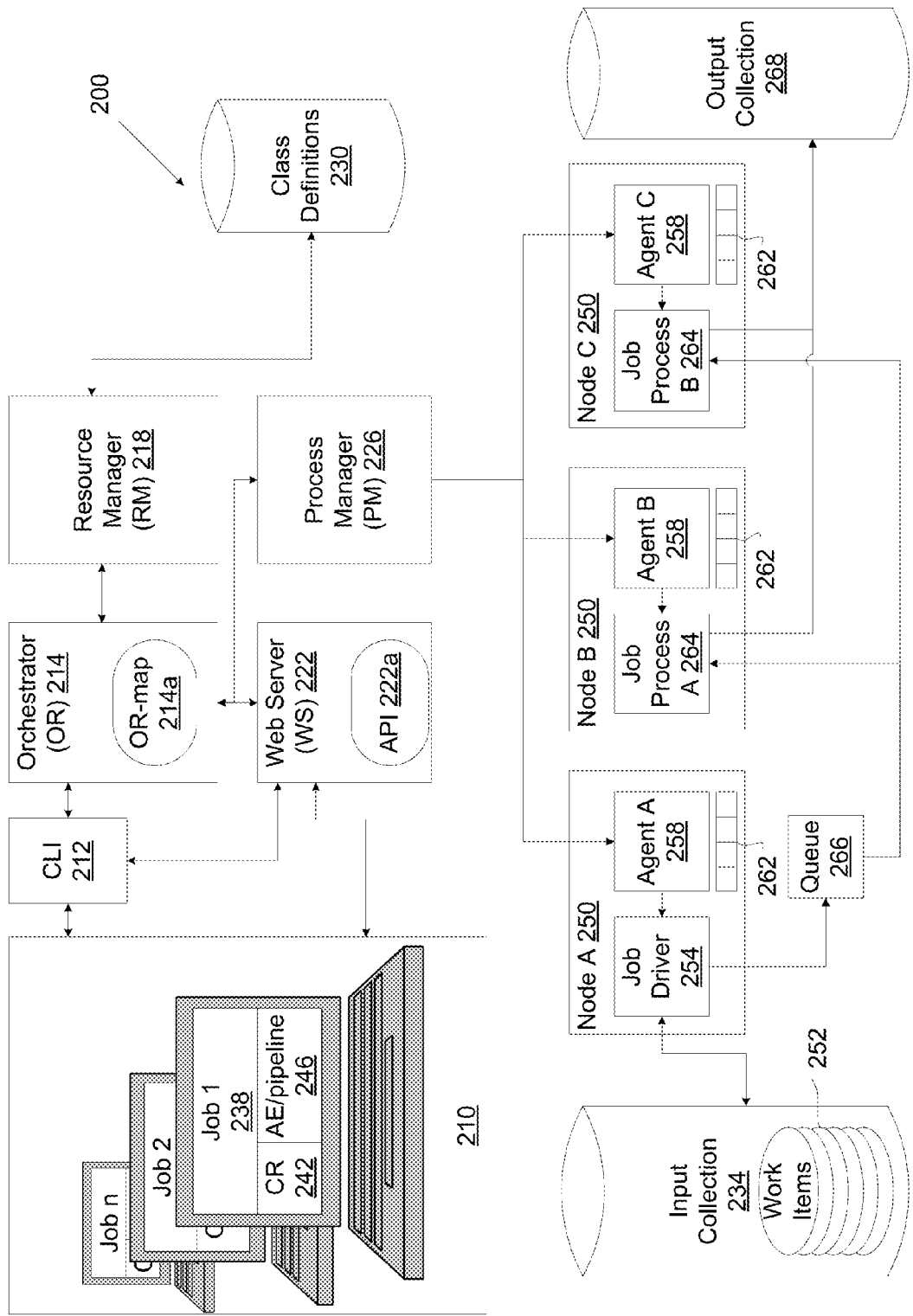
FIG. 2A is a schematic block diagram depicting a Distributed UIMA Cluster Computing (DUCC) system, according to an aspect of the disclosed invention.

Referring to FIG. 2A, according to an exemplary embodiment of the disclosed invention, a DUCC System may operate on one system (such as the computer system 100 described in connection with FIG. 1) in simulation mode, such that the DUCC System is partitioned as if it contains a cluster of nodes/computer systems (such as may be the case on a virtual machine). According to one alternative embodiment, the DUCC System 200 may operate on a node cluster depicted in FIG. 2A, having two or more Nodes 250, where each Node 250 may be the system 100 described in connection with FIG. 1. The DUCC System 200 may be implemented, for example, using UIMA Asynchronous Scaleout (UIMA-AS), which in turn employs UIMA-Core. Camel may be used for inter-component communications of the system, and ActiveMQ may be employed to process work items amongst a distributed set of work item processors. Logging may be facilitated by Log4J. Jetty may be used to implement a web server, and iQuery may be deployed to web browsers. These platforms (and others used by the disclosed invention) may be replaced by other platforms for equivalent functionality without departing from the spirit or scope of the disclosed invention. For example, Apache Active MQ may be replaced, where used, by IBM WebSphere MQ. The DUCC System 200 may be implemented on Linux. Where implemented on a cluster of nodes (as illustrated in FIG. 2), the DUCC System 200 may rely upon common userids across the cluster, and a shared file system for user and DUCC data across the cluster (such as Network File Systems, "NFS").

Communications between singleton and distributed components/daemons of the DUCC System 200 may be accomplished via messaging, with various components publishing states or reports at regular intervals, and each message encapsulating a current and/or desired state for its target audience. As such, actions may be delayed, but will be carried out as soon as the next message is published. In one embodiment, communication between the various components is accomplished using the Apache ActiveMQ™ (AMQ) broker that facilitates publications and subscriptions to queues and topics. For example, the Orchestrator 214 may publish an OR-map 214a to an AMQ™ topic at regular intervals. Coincidentally, the Web Server 222 and the Resource Manager 218, as well as other components and entities in the DUCC System 200, may subscribe to that AMQ™ topic in order to receive updated OR-map 214a information at the regular intervals. This scheme allows for a flexible, fault-tolerant system since, in the event of a missed message, the next publication will update the subscriber to the current information. Likewise, each component may publish to a topic or queue to disseminate information, and each component may subscribe to a topic or queue to receive information. As such, the Agents 258 may publish node information (about their respective Nodes 250), and the Resource Manager 218 may subscribe to the Agents' 258 node information, and in turn publish scheduling information.

According to the embodiment depicted in FIG. 2A, the DUCC System 200 may allow one or more users 210 to communicate with the DUCC System 200 via a Command Line Interface (CLI) 212 or a Web Server (WS) 222 to perform a set of tasks. In one embodiment, the communication may include a request to the DUCC System 200 by the user 210 to process one or more Jobs 238 (such as Jobs 1-n). Related embodiments may facilitate the batch processing of Jobs 238. The Jobs 238 (including the Collection Reader 242 and the pipelines 246) may be user 210 provided code submitted to the DUCC System 200 for processing a set of work items 252 associated with the Job 238 and contained in an Input Collection 234. The work items 252 may be, for example, textual data to be searched and/or analyzed by the pipelines 246 component of a given Job 238. A Job 238 may include two components: a singleton work item supplier called a Collection Reader (CR) 242, and one or more pipelines (each pipeline being user code), each called an Analysis Engine (AE) 246 (the terms "pipeline" and "AE" are used interchangeably). The pipelines 246 may themselves include one or more duplicate threads, such that each pipeline can simultaneously process multiple work items. The number of pipelines 246 and threads per pipeline may be configurable per Job 238. Processing a Job 238 may include starting, stopping, or modifying the Job 238, and a user 210 may submit a request for such processing to the DUCC System 200 through, for example, the CLI 212 or the Web Server 222. A single Job 238 may be processed by multiple Nodes 250 (for example, the Job 238 may have multiple threads that may include duplicate threads), and a single Node 250 may process multiple Jobs 238 belonging to a single user 210, or multiple users 210.

A Job 238 may have a state. The state may represent the extent to which the Job 238 has been processed by the DUCC System 200 (for example, whether it has just been received from a user 210, or it has been completed). As the processing of the Job 238 continues, the Job 238 changes its state. The transition from a first state to a last state may be referred to as a lifecycle, which may also be referred to as a "state machine". A list of possible states showing a lifecycle of a Job 238, according to one aspect of the disclosed invention, is contained in Table 1: Job State Machine, below.

TABLE 1

Job State Machine

| ID | Name | Next | Description |
|---|---|---|---|
| 1 | Received | 2, 7 | Job 238 has been vetted, persisted, and assigned a unique ID |
| 2 | WaitingForDriver | 3, 4, 7 | Process Manager 226 is launching Job Driver 254 |
| 3 | WaitingForServices | 4, 7 | Service Manager (not shown) is checking/starting service dependencies for the Job 38 |
| 4 | WaitingForResources | 5, 7 | Resource Manager 218 is assigning resources to the Job 238 |
| 5 | Initializing | 6, 7 | Process Agents 258 are initializing Pipelines 246 |

TABLE 1-continued

Job State Machine

| ID | Name | Next | Description |
|---|---|---|---|
| 6 | Running | 7 | At least one Agent 258 has reported process initialization complete |
| 7 | Completing | 8 | Job 238 processing is completing |
| 8 | Completed | — | Job 238 processing has completed |

According to another embodiment, to help support Jobs 238, the DUCC System 200 may also process a Reservation(s) and/or a Service(s) (including starting, stopping or modifying the Reservation and/or Service), and/or an Individual Process(es) (including stopping the Process), as follows (Reservations, Services, and Individual Processes are not shown in the FIGS.). It may provide facilities for Reservations of two types: Managed and Unmanaged. Once allocated, Reservations persist until canceled. Managed Reservations include "arbitrary" processes (for example, Java or C programs, bash shells, etc.). Unmanaged Reservations may include a computing resource that can be utilized for any purpose, subject to limitations of an assigned DUCC-Share(s) 262 (defined below). An Unmanaged Reservation may include, for example, a segment of memory that a Job 238 wishes to use for any purpose (for example, to facilitate a particular operation the user 210 wishes the Job 238 to perform, the Job 238 may require a block of RAM of a certain size).

Services (not shown) offered by the DUCC System 200 may include two types: UIMA and Ping-Only. Services may be predefined in a registry, and Jobs 238 may declare dependency on one or more of them. Services may be shared by multiple Jobs 238 or tied to just one. They may be started at the DUCC System 200 boot time or at Service definition time or at Job 238 launch time. They may expand and contract by command or on-demand. Services may be stopped by command or due to a lack of demand. Services may facilitate DUCC System 200 efficiency due to high start-up costs or high resource consumption. Benefits of cost amortization may be realized by sharing Services amongst a collection of Jobs 238 rather than employing a private copy for each one. The lifecycle of each UIMA Service may be managed by the DUCC System 200, whereas Ping-Only Services are not managed by the DUCC System 200. Ping-Only services may, however, include a "pinger" which adheres to a standard interface and provides health and statistical information to the DUCC System 200 regarding a custom Service with which it is associated.

Reservations and Services (not shown) may each have a series of states and a corresponding lifecycle, in a manner similar to the states and lifecycle of a Job 238. Lists of possible states for Reservations and Services, according to an aspect of the disclosed invention, are included in Table 2: Service State Machine, Table 3: Unmanaged Reservation State Machine, and Table 4: Managed Reservation State Machine, below.

TABLE 2

Service State Machine

| ID | Name | Next | Description |
|---|---|---|---|
| 1 | Received | 2, 3, 6 | Service has been vetted, persisted, and assigned a unique ID |
| 2 | WaitingForServices | 3, 6 | Service Manager (not shown) is checking/starting Service dependencies for the Service |

TABLE 2-continued

Service State Machine

| ID | Name | Next | Description |
|---|---|---|---|
| 3 | WaitingForResources | 4, 6 | Resource Manager 218 is assigning resources to Service |
| 4 | Initializing | 5, 6 | Process Agents 258 are initializing Pipelines 246 |
| 5 | Running | 6 | At least one Agent 258 has reported process initialization complete |
| 6 | Completing | 7 | Service processing is completing |
| 7 | Completed | — | Service processing has completed |

TABLE 3

Unmanaged Reservation State Machine

| ID | Name | Next | Description |
|---|---|---|---|
| 1 | Received | 2, 3, 6 | Reservation has been vetted, persisted, and assigned a unique ID |
| 2 | Assigned | 3 | DUCC-Shares 262 are assigned |
| 3 | Completed | — | DUCC-Shares 262 not assigned |

TABLE 4

Managed Reservation State Machine

| ID | Name | Next | Description |
|---|---|---|---|
| 1 | Received | 2, 3, 5 | Reservation has been vetted, persisted, and assigned a unique ID |
| 2 | WaitingForServices | 3, 5 | Service Manager (not shown) is checking/starting service dependencies for Reservation |
| 3 | WaitingForResources | 4, 5 | Resource Manager 218 is assigning resources to Reservation |
| 4 | Running | 5 | Process Agent 258 has reported program launched |
| 5 | Completing | 6 | Reservation processing is completing |
| 6 | Completed | — | Reservation processing has completed |

With continued reference to FIG. 2A, exemplary embodiments of the invention may implement a fair share paradigm for allocating system resources (the memory shares in the DUCC System 200 may be divided equally among all the users 210 who have work pending in the system. Once an allocation is assigned to a user 210, that user's 210 jobs are then also assigned an equal number of shares, out of the user's 210 allocation). Such resources may include, for example, physical or virtual memory space, which the DUCC System 200 may divide into equal DUCC-Shares 262. According to one embodiment, the DUCC-Shares 262 may correspond to memory segments in Random Access Memory (RAM). The size of the DUCC-Shares 262 may differ from one embodiment of the invention to the next, and may be made dynamically configurable such that the size changes depending on the number and types of Jobs 238 that run on the DUCC System 200 at a given time. The DUCC-Shares 262 may reside on a shared resource (such as shared memory) accessible by one or more of the Nodes 250 in the DUCC System 200, or they may reside in multiple parts on separate Nodes 250 in the cluster. They may further be sub-partitioned into Job Driver Shares (JD-Shares; not shown) such that each Job 238 is allocated one JD-Share and, based upon a memory size specified by a requesting user 210, is assigned one or more DUCC-Shares 262. Reservations and Services have only DUCC-Shares 262. Accordingly, the DUCC System 200 may facilitate processing of multiple Jobs 238 by multiple users 210 on multiple Nodes 250.

In one embodiment, the Nodes 250 may be organized into nodepools. A nodepool is a grouping of a subset of the physical nodes to allow differing scheduling policies to be applied to different Nodes 250 in the system. Some typical nodepool groupings might include:

Group Intel® and Power® Nodes 250 separately so that users 210 may submit jobs that run only in Intel® architecture, or only Power®, or "don't care"

Designate a group of Nodes 250 with large locally attached disks such that users can run Jobs 238 that require those disks Designate a specific set of Nodes 250 with specialized hardware such as high-speed network, such that Jobs 238 can be scheduled to run only on those Nodes 250

A nodepool may be a subset of some larger collection of nodes. Nodepools themselves may be further subdivided. In one embodiment, nodepools may not overlap: every Node 250 belongs to exactly one nodepool. During system start-up, the consistency of nodepool definition may be checked and the system may refuse to start if the configuration is incorrect.

According to an exemplary embodiment, Linux Control Groups may be used to enforce limits on DUCC-Shares 262 allocated to the Jobs 238. The system may be configured such that only an offending Job 238 is penalized. For example, if a given Job 238 exceeds its memory DUCC-Share size, then it may be forced to swap while other Jobs 238 on the DUCC System 200 remain unaffected.

Preemption may be employed to re-apportion DUCC-Shares 262 when new work is submitted to the system. Furthermore, a set of Class Definitions 230 may be defined to guide the system in pre-empting prior DUCC-Shares 262 allocation. For example, the DUCC System 200 may be configured to have only one preempt scheduling class and resources comprising 11 DUCC-Shares 262, and one such share 262 is allocated for partitioning into JD-Shares. When Job 1 is submitted to the system, it is entitled to all remaining 10 shares 262. When Job 2 arrives, each of Job 1 and Job 2 is entitled to only 5 shares. Thus, 5 DUCC-Shares 262 are preempted and reassigned to Job 2.

With continued reference to FIG. 2A, the DUCC System 200 may facilitate the processing of work items 252 by the Jobs 238 through a set of daemons or components that may include an Orchestrator (OR) 214, a Job Driver (JD) 254, a Resource Manager (RM) 218, a Process Manager (PM) 226, a Services Manager (not shown), other components such as the CLI 212, an Application Program Interface (API) 222a, a Web Server 222, and one or more Agents 258 (such as the Agents A-C). Each Node 250 in the DUCC System 200 may be provided with one Agent 258. The precise functioning of each of these components is described in greater detail, below.

With continued reference to FIG. 2A, generally, the Orchestrator 214 in the DUCC System 200 may perform a variety of functions, including: receive user 210 requests to process one or more Jobs 238, and acting upon those requests; managing and publishing each Job's 238 common state to other components of the DUCC System 200 (which may in turn inform their actions); maintain checkpoint and historical states (which may assist in providing fault tolerance across the system, among other functions); and manage the lifecycles of the Job 238, Reservations and Services from start to completion. The Orchestrator 214 may receive user 210 requests to start, stop, or modify Jobs 238 (or Services or Reservations) through the CLI 212 or Web Server 222, and manage the deployment of these Jobs to one or more of the Nodes 250 available in the system.

Figure 2B:
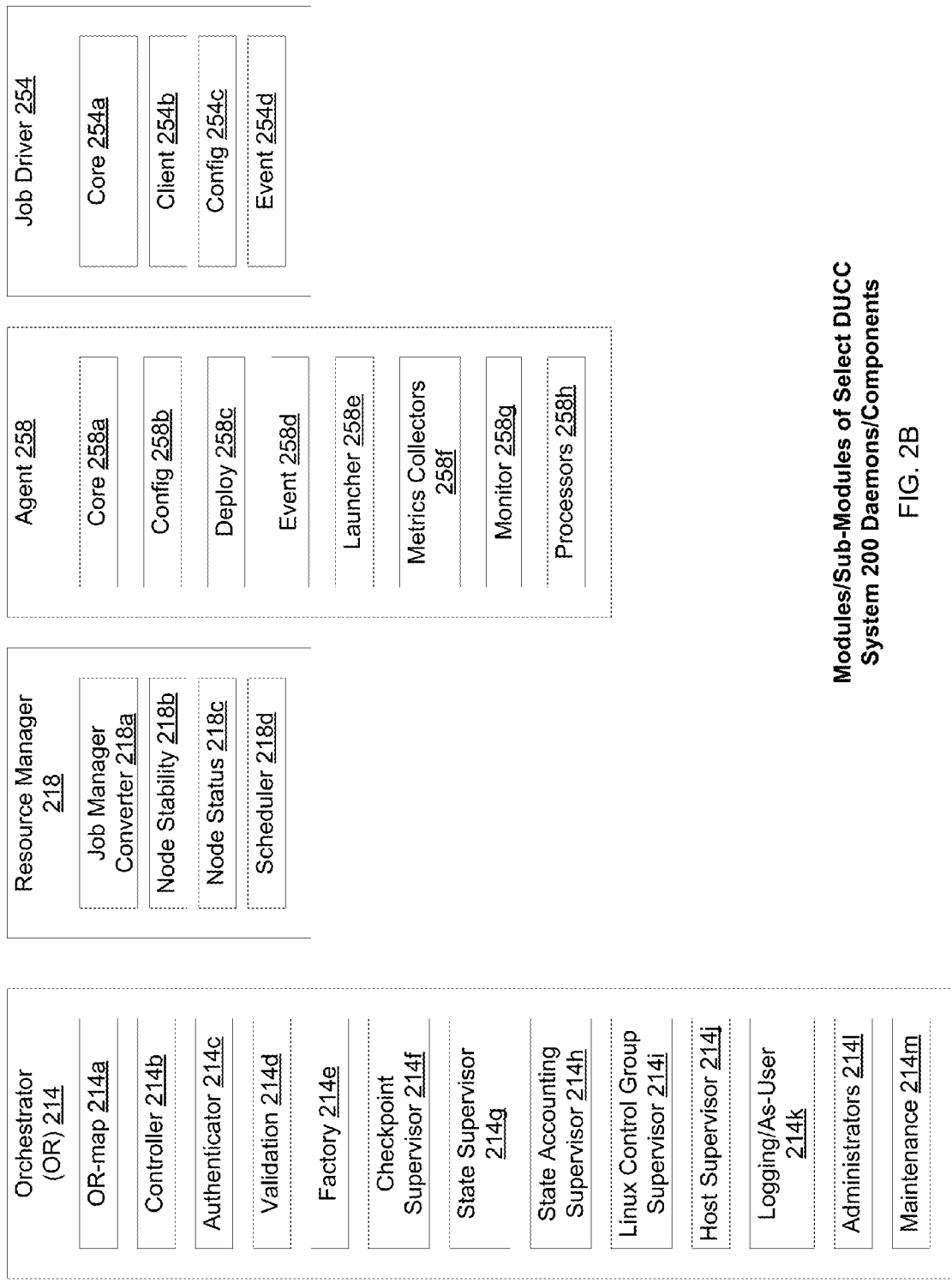
FIG. 2B is a schematic block diagram depicting sub-components of select DUCC system components depicted in FIG. 2A.

Referring now to FIGS. 2A-B, the Orchestrator 214 may perform its various functions using several modules. For example, it may publish and receive reports. Its published report may be contained in an OR-map 214a component/module, which may be configured to act as the final authority on the state of each Job 238 received by the Orchestrator 214. A published report, whether generated by the Orchestrator 214 or any other component of the DUCC System 200, may include a report that is made available for access by other components of the DUCC System 200. According to one embodiment, the Orchestrator 214 may include a one or more additional sub-components to perform a variety of functions, including: a Controller 214b module, an Authenticator 214c module, a Validation 214d module, a Factory 214e module, a Checkpoint Supervisor 214f module, a State Supervisor 214g module, a State Accounting Supervisor 214h module, a Linux Control Group Supervisor 214i module, a Host Supervisor 214j module, a set of Logging/As-User 214k modules, an Administrators 214l module, and a Maintenance 214m module. These modules/components are described in greater detail, below.

The Controller 214b module of the Orchestrator 214 may receive user 210 submitted requests and process them to completion in accordance with an instance of the appropriate state machine (see Tables 1-4, above). User 210 submitted requests may include:

For a Job 238, {Start, Stop, Modify}
For a Reservation, {Start, Stop, Modify}
For a Service, {Start, Stop, Modify}
For an Individual Process, {Stop}

The Controller 214b may further receive status messages from other DUCC System 200 components and advance the state machines of user submitted Jobs 238, Reservations, or Services as necessary. The Controller 214b may act as the final authority for the DUCC System 200 overall state, including active Jobs 238, Reservations, or Services. The Controller 214b may publish the DUCC System 200 overall state at regular intervals for consumption and use by other components of the DUCC System 200.

The Authenticator 214c module may determine user 210 authentication, such as whether the user 210 has the privileges it asserts or whether the user 210 is a DUCC System 200 administrator. Authentication in the system may be configured such that an administrator is given the ability to control DUCC System 200 functions and to act on behalf of other users 210.

The Validation 214d module may validate each user 210 request (such as request to start, stop, or modify) against a set of criteria that define acceptableness. In the case of missing information, a default value may be employed. Such criteria may include, for example, the number of process instances or the number of threads per process of the Job 238, and a scheduling class (checked against the Class Definitions 230). Other criteria may be validated by the CLI 212 prior to the user's 210 request arriving at the Orchestrator 214.

The Factory 214e module may enter a state machine representation, corresponding to an accepted "submit" request by the user 210, into the published OR-map 214a with an initial state of "Received" (see Table 1, above). The request may remain active until it advances to a final state of "Completed". The Factory 214e module may construct a representation of the producer of work items (Common Analysis System, "CAS") and the processor of work items 252 (i.e., UIMA-AS distributed pipelines 246). It may facilitate user 210 specification of pipelines 246 as deployment descriptor or aggregate components. In the latter case, the DUCC System 200 may dynamically construct a deployment descriptor.

Each Factory-214*e* created state representation may include a variety of fields and associated information, such as:

Standard information, such as a unique identifier assigned by the DUCC System 200; type of request (Job 238, Reservation, or Service); user name; submitting PID (Operating System Process Identifier); date of submission; date of completion (initially null); description (text supplied by the submitting user 210)

Scheduling information, such as scheduling class (if valid, it may correspond to a defined class contained in the Class Definitions 230); scheduling priority; minimum and maximum scheduling DUCC-Shares 262; scheduling threads per DUCC-Share 262; scheduling memory size; scheduling memory units Job Driver 253 information such as Java command; Java classpath; environment variables; user log directory; MQ broker (a message queuing service that can buffer messages between senders and receivers, including topics and queues); MQ queue (A message queuing service which receives messages from senders and delivers same to receivers. Each sent message is delivered to exactly one receiver. One or more senders can put messages onto the queue, and one or more receivers can remove messages from the queue); MQ topic (A message queuing service which receives messages from senders and delivers same to receivers. Each message sent to a topic is delivered to all subscribers of same topic); CR 242 descriptor (a file, usually in XML format, that configures the corresponding CR to behave in a customized way); Collection Reader 242 overrides (run-time parameters that configure and take precedence over CR descriptor specified customizations for a corresponding CR); getMeta timeout value (a value received from the UIMA-AS Service. The metadata may be obtained from the Service during initialization. It may also include another value received from an asynchronous Analysis Engine service, or null if initialization has not occurred. In other words, it says whether or not the UIMA entity is up and running); work item 252 processing timeout value and exception handler; Node 250 identity; Linux Control Group limits; and state Service information (having one or more instances, similar to Job 238 process information)

Managed reservation information

Unmanaged reservation information

According to one embodiment, the Job Driver (JD) 253 described above may be a subcomponent of the Factory 214*e* module of the Orchestrator 214, and may be deployed on a Node 250, such as Node A. The Job Driver 254 may retrieve work items 252 from the Input Collection 234 and prepare them in a Queue 266 so that they may be accessed by individual Job Processes (JP) 264 (such as Job Process A on Node B or Job Process B on Node C). According to an aspect of the disclosed invention, there is one Job Driver 254 per Job 238 active on the DUCC System 200. The Job Driver 254 may implement a generic algorithm into which a user supplied Collection Reader 242 is plugged-in for each Job 238. The Job Driver 254 may interact with the rest of the DUCC System 200 to fetch and buffer work items 252 (CASes) from the user supplied Collection Reader 242 to keep the corresponding distributed pipelines 246 well supplied. It also may handle errors and carry out retry policies based upon parameters specified in the user 210 submission or as configured in the DUCC System 200. The Job Driver 254 may be managed and controlled by the Process Manager 226.

The Checkpoint Supervisor 214*f* module may save and restore state information to/from persistent storage. A saved state may be restored whenever a significant change occurs, such as at the time the Orchestrator 214 is booted. Saving and restoration of state facilitates reasonable continuity of service between Orchestrator 214 lifetimes.

The State Supervisor 214*g* module may receive and examine publications from other DUCC System 200 components, and may further record and distribute pertinent information obtained or derived, and advance state machines appropriately based on such information (see Tables 1-4, above). Publications may be received by the State Supervisor 214*g* module from the following non-exclusive list of components:

Job Driver(s) 254

Resource Manager 218

Services Manager (not shown)

Agent(s) 258 Inventory

Information from these sources may be recorded in the OR-map 214*a*. Based on information derived from all sources, the Orchestrator 214 may advance the state machines of currently active entities (such as Jobs 238, Reservations or Services). Once the "Completed" state is reached, the entity is no longer active on the cluster. OR-map 214*a*, in turn, may be published at regular configurable intervals for use by the other DUCC System 200 singleton and distributed daemons.

The State Accounting Supervisor 214*h* module may manage a finite state machine for Jobs 238, Services and Reservations (see Tables 1-4, above). It may provide functions to advance a current state to a next valid state, and/or to advance a current state immediately to the "Completed" state.

The Linux Control Group Supervisor 214*i* module may assign a maximum size (in bytes) and a composite unique identity to each DUCC-Share 262 in the DUCC System 200. This information may be published for use by the Agents 258 to enforce Linux Control Group limitations on storage used by the corresponding entity using such DUCC-Shares 262 (for example, a pipeline 246). Employing Linux Control Groups is analogous to defining virtual machines of a certain size, such that exceeding limits causes only the offending process to suffer any performance penalties, while other co-located well-behaved processes run unaffected.

The Host Supervisor 214*j* module may obtain sufficient resources on a Node 250 for deploying Job Driver(s) 254 for all submitted Jobs 238. The Host Supervisor 214*j* may interact with the Resource Manager 218 to allocate or de-allocate resources. It may assign a JD-Share (not shown) to each active Job 238. A JD-Share may be a Linux Control Group controlled DUCC-Share 262 of sufficient size into which a Job Driver 254 can be deployed. A JD-Share may be significantly smaller than a normal DUCC-Share 262.

The Logging/As-User 214*k* modules of the Orchestrator 214 may permit the Orchestrator 214 to write logging data into a file contained in user-space, meaning a file into a directory writable by a submitting user 210, during processing of a submitting entity, such as a Job 238, a Managed Reservation, etc. The Logging/As-User 214*k* modules may also facilitate the recording to persistent storage of noteworthy events occurring during the Orchestrator 214 lifetime. Noteworthiness may be predefined and configurable (for example, by an administrator), and may be set at various levels, such as INFO, DEBUG, and TRACE.

The Administrators 214*l* module of the Orchestrator 214 may grant users 210, defined in a predetermined file location, special privileges such as the ability to cancel any user's 210 Job 238.

The Maintenance 214*m* module of the Orchestrator 214 may initiate at regular intervals to perform a variety of tasks, which may be done, for example, through execution of other modules (i.e., sub-modules). These tasks/module may include one or more of the following:

- Health—The Maintenance 214m module may automatically cap Jobs 238 and Services that exceed initialization error thresholds, and cancel those that exceed processing error thresholds
- MQ Reaper—The Maintenance 214m module may cleanup unused Job Driver 254 AMQ™ permanent queues for Jobs 238 that have a "Completed" state. AMQ™ stands for Active MQ, a particular implementation of message queuing. MQ supports two types of queues: temporary and permanent. Permanent Queues are created, used, then destroyed by the application. Temporary queues are created and used by the application, but are destroyed by the MQ when the application terminates.
- Publication Pruning—The Orchestrator 214 may regularly publish the state of each active entity on the DUCC System 200, such as a Job 238, and for recently "Completed" ones. The Maintenance 214m module may remove from regular Orchestrator 214m publications state information for those entities that have "Completed" past a configurable time threshold, nominally one minute.
- Node Accounting—The Maintenance 214m module may track each Node's 250 state; up or down. Nodes 250 that do not report for a time exceeding a threshold, typically a few minutes, may be considered down. This information may be used for Jobs 238 whose Job Driver 254 has advanced to the "Completed" state, whereby corresponding Job Processes 264 on Nodes 250 that are reported down are marked as "stopped" by the Orchestrator 214 (as opposed to waiting, potentially forever, for the corresponding Agent 258 to report). This may prevent Jobs 238 from becoming unnecessarily stuck in the "Completing" state.

Referring now to FIG. 2A, the Resource Manager 218 may be implemented as a singleton daemon in the DUCC System 200. The Resource Manager 218 may allocate constrained resources of the DUCC System 200, such as DUCC-Shares 262, amongst valid user 210 requests over time. It may publish and receive reports. It may receive Orchestrator 214 publications (via the OR-map 214a, for example) regarding entities in the system, such as Jobs 238, Reservations, or Services, as well as Agent 258 publications including Node Inventory and Node Metrics (defined in connection with a comprehensive definition of the Agents 258 components of the DUCC System 200, below). The Resource Manager 218 publication may occur at regular intervals, each representing, at the time of its publication, the desired allocation of resources. According to one embodiment, the Orchestrator 214 may be the primary consumer of the Resource Manager 218 publication which it uses to bring the cluster of Nodes 250 into compliance with the allocation assignments of the Resource Manager 218. According to this embodiment, the Resource Manager 218 determines resource allocation, and the Orchestrator 214 allocates the constrained resources according to that determination.

In making its resource assignments, the Resource Manager 218 may consider various factors, including: supply of available Nodes 250; memory size of each available Node 250; demand for resource in terms of memory size and class of service comprising Jobs 238, Reservations, or Services; and the most recent previous assignments and desirability for continuity. The constrained resources may include, without limitation, one or more of the following: Nodes 250, and attributes thereof, such as real memory, virtual memory, CPUs, cores, disk space, paging space, attached FPGAs, or other valuable and/or shareable entities.

Referring now to FIGS. 2A-B, according to the disclosed embodiment of the invention, the Resource Manager 218 may, through a series of modules (or sub-modules), perform the following functions:

- Receive resource availability reports from Agent(s) 258
- Receive resource need requests from the Orchestrator 214
- At discrete time intervals:
  - Consider the resource supply
  - Consider the most recent allocation set
  - Consider new, changed, and removed resource demands
  - Assign a resource to a request
  - Remove a resource from a request
  - Publish a current resource allocation set This series of modules may include, in one embodiment, a Job Manager Converter 218a module, a Node Stability 218b module, a Node Status 218c module, and a Scheduler 218d as follows.

The Job Manager Converter 218a module may receive Orchestrator 214 publications and update its internal state with new, changed, and removed map entries including Jobs 238, Reservations, or Services.

The Node Stability 218b module may evaluate the health of the Nodes 250 within the DUCC System 200 for consideration during resource scheduling and assignments. Any Node 250 deemed unhealthy may be removed from the collection of available resources until such time as it once again is deemed healthy.

The Node Status 218c module may receive Agent 258 publications, and may update its internal state with new, changed, and removed Node 250 status entries.

The Scheduler 218d module may run at discrete intervals. It may assemble information about available Nodes 250 in the DUCC System 200 cluster. Since each Node 250 may be partitioned into zero or more DUCC-Shares 262 based upon its memory size, each request (Jobs 238, Reservations, or Services) may be assessed as to the number of DUCC-Shares 262 it requires, based upon user-specified memory size, other user-specified constrained resource requirements, and system availabilities. In addition, each request may be assessed with respect to the user-specified class-of-service, which may be checked against the Class Definitions 230.

Referring now to FIG. 2A, the DUCC System 200 may also include a singleton Services Manager daemon (not shown). The Services Manager may facilitate Services definitions and persistence, and monitor and control services as dependencies on-demand. By sharing Services, resources may be more effectively employed and work items 252 processing may be completed sooner. Some aspects of the Services Manager may include:

- Long warm-up time—When a Service takes a long time to warm-up, the Job 238 it supports may sit idly for a long time before the first work item 252 can be processed, until the Service upon which it depends has initialized and is ready. If the Service is already up and ready, this delay may be avoided or minimized.
- Large storage use—When a Service has a large memory footprint, it may be more efficient to have multiple Jobs 238 share the Service rather than having separate copies for each.
- Short processing time—If the time to process a work item 252 is relatively short, it may be more efficient to share the Service amongst multiple Jobs 238 so that the DUCC-System 200 does not spend too much of its resources generating and maintaining short-lived Services.

Not used—If a Service has not been used for a relatively long time, it may be more efficient to shut it down and reclaim its resources for use elsewhere, especially on a busy cluster.

The Services Manager may include a set of modules (i.e. sub-modules) that facilitate its functions. According to an aspect of the invention, these may include a Ping Driver, A Service Handler, and a Service Manager and API Handler. These modules may function as follows:

Ping Driver—this module may carry out Service Manager validated request operations.

Service Handler—this module may receive and validate Service request operations.

Service Manager, API Handler—the Services Manager may maintain a registry of Services. The attributes of these Services may include one or more of the following:
permanent—a Service that is kept up so long as the DUCC System 200 is running
on-demand—a Service that is kept up only during the lifecycle of one or more Jobs 238 that declare a dependency on the Service
lingering—a Service that continues for some limited time beyond the lifecycle of the last dependent Job 238 in anticipation of another Job 238 arrival in the near future that may declare a dependency on the lingering Service
dynamic—a Service that automatically expands and contracts in terms of its number of instances to meet demand
registered—a Service that is pre-defined, whose definition is kept persistently and whose lifecycle is managed by the DUCC System 200
custom—a Service that is unregistered and not pre-defined, whose definition is not kept persistently and whose lifecycle is not managed by the DUCC System 200 (for example, it may be managed by another system connected to by the DUCC System 200)

According to an aspect of the disclosed invention, the Service Manager may keep within its registry information of two types: service and meta. The service information may include the following attributes: classpath, description, environment, Java Virtual Machine (JVM), JVM args, log directory, deployment descriptor, failures limit, memory size, scheduling class, linger time, pinger classpath, pinger log, pinger timeout, service endpoint, and working directory. The meta information may include the following attributes: autostart, endpoint, implementers, instances (count), identifier (number), ping-active, ping-only, service-active, service-class, service-health, service-state, service-statistics, service-type, stopped, user, uuid, and work-instances (PID list).

Referring now to FIG. 2A, the DUCC System 200 may also include a singleton Process Manager 226 module. The Process Manager 226 may monitor and control processes supporting the analytic pipelines 246 distributed over a collection of Agent-managed Nodes 250. It may both publish and receive reports. In particular, it may receive the Orchestrator 214 publications for Jobs 238, Reservations, and Services. The Process Manager 226 may publish or distribute two publications at regular intervals. One may be heartbeat information to notify to the Orchestrator 214 and the Web Server 222 that the Process Manager 226 is alive. The other publication may be compacted information destined to the Agent(s) 258 as to processes that need to start, stop, or receive modification. The Process Manager 226 may manage the distributed Agents 258, each of which manages Job Processes 264 (corresponding to one or more pipelines 246) running locally on the corresponding Node 250. The Process Manager 226 may intercept the Orchestrator 214 publications and redistribute only the essentials to the collection of distributed Agents 258 who each independently act to bring the state of locally deployed Job Processes 264 into compliance with the directives of the Orchestrator 214. The Process Manager 226 may also monitor and control Job Driver(s) 254.

Referring now to FIGS. 2A-B, according to an aspect of the disclosed invention, the Process Manager 226 may perform the above functions with the aid of Agent 258 modules. There may be one Agent 258 per Node 250 in the DUCC System 200. The Agents 258 may collectively deploy, monitor and control one or more Job Processes 264 supporting pipelines 246 deployed on their respective Nodes 250. They also may publish Node Inventory and Node Metrics reports (described below). At the direction of the Process Manager 226, each Agent 258 may be instructed to manage its assigned DUCC-Shares 262 by means of Linux Control Groups, and by injecting into them local process elements including Job Drivers 254, Job Processes 264, Service Processes (not shown), and Managed Processes (not shown). Each Agent 258 module may have sub-modules including: a Core module 258$a$; a Config module 258$b$; a Deploy module 258$c$; an Event module 258$d$; a Launcher module 258$e$; Metrics Collectors modules 258$f$; a Monitor module 258$g$; and Processors modules 258$h$. These modules function as follows.

The Core module 258$a$ may publish information about the state of the Node 250 hosting the Agent 258. It may also receive publications which it interprets to control processes deployed thereon. The Core 258$a$ may also monitor activity on the Node 250 and ensure that only sanctioned processes are running (and report unauthorized processes as part of the Agent 258 node metrics report, and terminate the unauthorized processes). The Agents 258 may normally launch at DUCC System 200 startup time. However, Agents 258 may be started/stopped independently over time. Such functionality of an Agent 258 and similar functionality may be handled by the Core 258$a$ module.

The Config module 258$b$ of a given Agent 258 may configure that Agent 258 and aspects of its operation. Such aspects may include, for example: launcher thread pool size; launcher process stop timeout; a rogue process exclusion filter (processes in this list may be exempt from rogue process detection and termination); and a rogue process user exclusion filter (users in this list may be exempt from rogue process detection and termination). The Agent 258 may publish reports at configurable intervals, and such configurations may be controlled by the Config 258$b$ module. The reports may include a Node Inventory (a report on the Agent-managed processes on a given Node 250), and Node Metrics report (a report on the Agent-observed metrics on a given Node 250).

The Deploy module 258$c$ may be an Agent-managed integration between UIMA-AS and the user 210 supplied code (as part of a submitted Job 238, for example) deployed onto that Agent 258.

The Event module 258$d$ may include an Event Listener (not shown) that handles publication events:
Process Start—a notification from the Process Manager 226 to start a user-submitted process constrained to a Resource Manager 218 allocated number of DUCC-Shares 262
Process Stop—a notification from the Process Manager 226 to stop a user-submitted process
Process Modify—a notification from the Process Manager 226 to modify a user-submitted process
Process Purge—a notification from the Process Manager 226 to purge a user-submitted process; purging may entail removing a running process, sometimes referred to by its PID, from the system. It may be accomplished by sending, for example, a "kill -9" command to the Linux process.

Job State—a notification from the Process Manager 226 that may include an abbreviated state of the DUCC-managed collection of entities: Jobs 238, Reservations, and Services The Launcher module 258*e* may include a Launcher package (a set of sub-modules) tasked with starting user 210 processes on the corresponding Agent-managed Node 250. The Launcher package may include the following sub-modules (not shown):

CGroup Manager—this module may partition the Agent-managed Node 250 into DUCC-Shares 262, with limits on one or more aspects, including, but not limited to, memory or swap space. This module may start, maintain, and stop instant virtual machines in correspondence with Resource Manager 218 allocated DUCC-Shares 262 into which user-submitted processes may be launched. According to one embodiment, the DUCC System 200 may employ Linux's control groups facility and deploy it to each Node 200 to limit, account, and isolate resource usage, such as CPU, memory (such as DUCC-Shares 262), and I/O, for Agent 258 managed processes 254. The Agent managed processes 264 may be, for example, instant virtual machines. New processes 264 may be injected into an existing cgroup (for example, by a user 210), which may allow for further utilization of a preexisting resource that has been allocated to a Job 238, Service, Reservation (managed or unmanaged), or their processes 264.

Command Executor—this module may form the base class that launches a user-specified process within the Resource Manager 218 allocated DUCC-Share 262.

DUCC Command Executor—this module may launch a user-specified process within the Resource Manager 218 allocated DUCC-Share 262. The process may be constrained by a Linux Control Group and may be spawned as the submitting user 210.

JVM Args Parser—this module may extract user-specified JVM arguments for use in building an Agent-launchable sub-process including the user-specified executable code.

Launcher—This module may provide virtual Agent capability to the DUCC System 200. It may include a sub-module to launch multiple Agents 258 on the same Node 250 to simulate load. Each simulated Agent 258 may assume a given name and IP address.

Managed Process—this module may manage a state machine (see also, Tables 1-4, above) for each Agent-managed user 210 process. Allowable states may include:
Starting
Initializing
Ready
Failed
Stopped Process Stream Consumer—this module may capture and redirect user process output to a log file.

The Metrics Collector module 258*f* may observer, calculate, or otherwise gather specific metrics relative to the following categories:

Garbage Collection Statistics—information made available by the JVM that show how much time and effort has gone into recovering memory that may once have been allocated but is abandoned by the process Node 250 CPU, Node 250 CPU usage, Node CPU Utilization
Node 250 Load Average
Node 250 Memory Information
Node 250 Users 210
Process CPU Usage
Process Major Faults
Processes Resident Memory (i.e., how many bytes of core memory are in use by a process)
Process Swap Usage (how many bytes of paging-to-disk space are utilized by a process)

The Monitor module 258*g* may observe various Job 238 states and trigger actions when specific events occur. These may include, for example:

Agent Monitor—When an Agent 258 detects problems with the DUCC System 200 network, broker, or ping functions, it may terminate all Agent deployed processes on its respective Node 250.

Rogue Process Detector—the Agent may detect alien processes—those not expected for running the OS or DUCC or user processes deployed by DUCC. Depending on the system's configurable policy, the Agent 258 may log an alien detected event, send notification to subscribers of alien detection events, and/or, with root privilege, signal the alien process to terminate.

The Processors module 258*h* may assemble information for consideration when carrying out the Agent 258 duties as well as for publication to other interested DUCC System 200 daemons. Information collected may relate to the following categories:
Linux Node Metrics
Linux Process Metrics
Node Inventory
Node Metrics
Process Lifecycle
Process Metrics Referring now to FIG. 2A, according to an aspect of the invention, one Job Driver 254 per Job 238 may be deployed on a single Node 250 in the DUCC System 200. The responsibilities of the Job Driver 254 may be: fetching work items 252 to be processed by pipelines 246 of the corresponding Job 238, with a user-specified degree of parallelization; dispatching work items to the pipelines 246 distributed among the various Nodes 250; gathering and reporting on performance statistics and errors; retrying failed recoverable work items 252; and guaranteeing that individual work items 252 are not mistakenly simultaneously processed by more than one pipeline 246.

The Job Driver 254 may include a container into which the user-specified Collection Reader 242 is deployed. The Job Driver 254 may interact with the Collection Reader 242 to fetch Common Analysis System (CAS) entities or work items 252 for processing by a corresponding pipeline 246. The Job Driver 254 may be deployed into a JD-Share allocated by the Resource Manager 218 and managed by a DUCC Agent 258 (for example, Agent A).

Referring now to FIGS. 2A-B, the Job Driver 254 may include several modules (i.e. sub-modules), including Core 254*a*, Client 254*b*, Config 254*c*, and Event 254*d* modules. The Core 254*a* module may act as the main thread of the Job Driver 254. It may setup and execute the Job Driver 254 runtime environment to:

Initialize—It may setup all the system machinery to fetch and process work items 252.

Run—it may manage all the machinery to fetch and process work items 252; wait for eligibility (i.e., ensure that work items are not added to the Queue 266 until at least one Job Process 264 has been initialized); initialize a UIMA-AS client (i.e., create an instance and one thread client for each corresponding Job Process 264 thread); and queue work items 252 (while terminate conditions are absent, repeat the process of queuing one work item 252 for each thread, sleep for an interval, then recheck for termination and perform additional queuing).

The Core module may further include a Job Driver component module that initializes a Job Driver function, receives and evaluates information with respect to continuance or termination of the Job Driver 254, and triggers publication of the Job Driver 254 reports.

Job Driver Terminate Exception—this module may identify an exception and a possible reason for that exception when the Job Driver 254 abnormally terminates.

Synchronized Stats—this module may accumulate statistics in a thread-safe manner, and produce and maintain per-work item 252 records, such as: number of work items 252; minimum, maximum, and average times to complete a work item 252; and standard deviation of time to complete a work item 252.

The Job Driver 254 module may also include a Client 254b module, that in turn may include the following modules:

Callback State—this module may track work item 252 queuing states, which may include PendingQueued, PendingAssigned, and NotPending.

CAS Dispatch Map—this module may track work items 252 by generating and maintaining a map of work items 252 that includes Node 250 and Linux process identities.

CAS Limbo—this module may manage incomplete work items 252, and ensure that they are not simultaneously processed by multiple pipelines 246. It may be configured not to release work items 252 for retry processing elsewhere until it receives confirmation that a previous attempt has been terminated.

CAS Source—this module may manage CASes. It may employ a user-provided Collection Reader 242 to fetch CASes/work items 252 as needed to keep available pipelines 246 full until all CASes/work items 252 have been processed. It may save and restore CASes/work items 252 that may have been pre-empted, for example, during periods of Job Process 264 contraction.

CAS Tuple—this module may manage CAS/work item 252 instances with metadata, including a UIMA CAS object, a DUCC assigned sequence number, a CAS retry status, and a Job 238 identifier.

Client Thread Factory—this module may produce one UIMA-AS client thread instance for each CAS/work item 252 in progress.

Dynamic Thread Pool Executor—this module may maintain a client-size thread pool for processing CASes/work items. Each thread in the pool may be assigned to and may track one CAS/work item 252 sent out for processing. Each thread in the pool may be usable once processing for the associate CAS/work item 252 is complete. The thread pool may expand and contact in correlation with the number of Resource Manager 218 assigned DUCC-Shares 262

WorkItem Module—this module may represent one CAS to be processed, normally by one of the distributed pipelines 246. It may manage and track the lifecycle of a work item 252, which may include: start, getCAS, UIMA-AS sendAndReceiveCAS, and end/exception.

WorkItemFactory Module—this module may create a new work item 252 for a given CAS Tuple. It may associate a work item 252 with a UIMA-AS client thread.

WorkItem Listener—this module may process callbacks that indicate a given work item 252 has been placed on the Queue 266 and is awaiting grabbing by a Job Process 264; and a process callback that indicates a given work item 252 has been grabbed from the Queue 266 and is active in a pipeline 246 (with the associated Node 250 and Linux process identity provided).

The Job Driver 254 may also include a Config 254c module that publishes a Job Driver Status Report at configurable intervals. This report may be on the Job Driver 254 managed Collection Reader 242 and its associated work items 252, and may include work item 252 information such as total-to-process, number-finished, number-failed, number-retried and/or other status information.

The Job Driver 254 may also include an Event 254d module that receives and handles publication events, such as OR-map 214a publications by the Orchestrator 214, which is the final authority on the state of each Job 238, Reservation, or Service currently or formerly deployed on the DUCC System 200.

Referring now generally to FIG. 2A, the DUCC System 200 may include a User Interface Component (UI). According to one aspect of the disclosed invention, the UI may permit authorized users to submit, cancel and monitor distributed analytics on the DUCC System 200 (such as Jobs 238, Services and Reservations). It may further permit authorized users to administer the configuration and runtime aspects of the DUCC System 200. The UI may include an Application Program Interface (API) 222a accessible through, for example, the Web Server 222; and a Command Line Interface (CLI) 212. The UI may allow users to submit/create, cancel, update, or modify Jobs 238, Reservations, and Services. The UI may include sub-modules that facilitate its functionality, including, for example: the API 222a, the CLI 212, AIO (not shown), Web Server 222, JSON (not shown). Although UI components such as the API 222a have been depicted as forming a part of the Web Server 222, it may be implemented, in other embodiments, as a distinct portion of the DUCC System 200, and made accessible by the Web Server 222.

The API 222a may provide an application program interface to the DUCC System 200, enabling it to manage Jobs 238, Reservations, and Services, in a manner similar to the CLI 212 (see below).

The CLI 212 may provide a command line interface to the DUCC System 200, enabling it to manage Jobs 238, Reservations, and Services. These commands may include:
Submit (Job, Reservation or Service)
Cancel (Job, Reservation or Service)
Modify (Job, Reservation or Service)
Query (Job, Reservation or Service)

The AIO (All-In-One) (not shown) may provide test and debugging support in preparation for distributed deployment to the DUCC System 200. It may construct a representation of the producer of work items (CASes) and the processor of work items (i.e., UIMA-AS distributed pipelines 246). The AIO module may facilitate user specification of pipelines 246 as deployment descriptor or aggregate components. In the latter case, the DUCC System 200 may dynamically construct a deployment descriptor. It may include the following sub-modules:

All-In-One—this sub-module may create a process including a user-submitted Job 238; install the equivalent of a Job Driver 254; Install the equivalent of a Job Process 264; and process all work items 252 associated with the request.

All-In-One Launcher—this sub-module may launch an All-In-One process locally or remotely, according to user 210 specifications.

CAS Generator—this sub-module may employ a user-specified Collection Reader 242 to produce work items 252.

CAS Pipeline—this sub-module may employ user-specified analysis engines 246 to process associated work items 252.

DD Parser—this sub-module may parse the user-specified Deployment Descriptor and extract an import name. The Deployment Descriptor includes error handling and scalability options.

Message Handler—this sub-module may provide user-replaceable message handlers for info, debug, error, trace, etc.

The WS sub-module (not shown) of the CLI 212 may fetch machine facts, Reservations Facts, and Node 250 facts. This information may be obtained via interfacing between the CLI 212 and the Web Server 222.

The JSON sub-module (not shown) may provide the following functionality:

Machine Facts—the JSON may provide information management with respect to each Node 250 in the DUCC System 200, including status, IP, name, reserve, memory, swap, aliens, total DUCC-Shares 262, shares in use, and heartbeat information.

Reservation Facts—the JSON may provide information management with respect to each Reservation in the DUCC System 200 including ID, start, end, user 201, class, state, reason, allocation, user processes, size, list, and description information.

Node 250 Facts—the JSON may provide information management with respect to each Node 250 in the DUCC System 200, including a list of Nodes 250 and corresponding PIDs.

Referring now to FIG. 2A, according to an aspect of the disclosed invention, the Web Server 222 may facilitate the use of the Command Line Interface 212, the Application Program Interface 222a, and additional complimentary utilities. It may monitor publications and files produced by the Orchestrator 214, the Resource Manager 218, the Service Manager (not shown), the Process Manager 226, and each Agent 258. The Web Server 222 may also provide the users 210 (including an administrative user) web pages to:

Permit authorized users to submit, cancel and monitor distributed analytics (i.e. Jobs 238, Services and Reservations)

Login and logout

Monitor and control Jobs 238, Services and Reservations

Monitor and control DUCC System 200 administration, classes (contained in Class Definitions 230), DUCC System 200 daemons (including, for example, the Orchestrator 214, the Resource Manager 218, the Service Manager (not shown), the Process Manager 226, and each Agent 258)

Monitor and control Nodes 250

Display help and manual information

Control preferences

Perform queries and filter results

Figure 3:
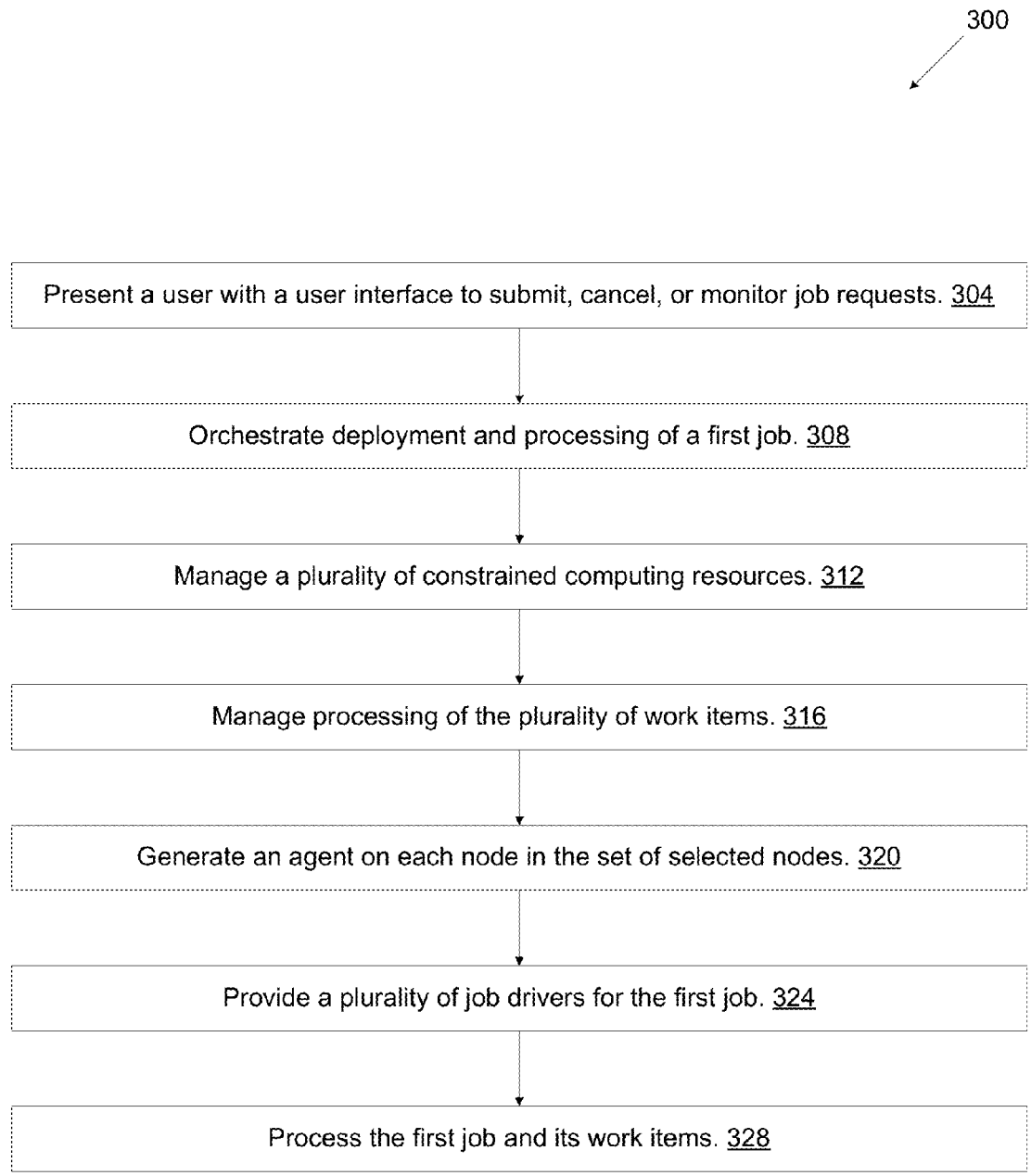
FIG. 3 is a flowchart depicting steps of a method according to an aspect of the disclosed invention.

The Web Server 222 may also provide runtime functionality to:

Automatically cancel Jobs 238, Reservations and Services based on inactivity Manage user 210 authentication, sessions and cookies Provide user customizable views Provide one-click access to deployed JVMs via jConsole Referring now to FIGS. 2A-3, and more particularly to FIG. 3, according to an aspect of the disclosed invention, a method 300 may process UIMA analytics such as Jobs 238, Services, and Reservations to transform a set of work items 252, on a cluster of computing nodes, such as the DUCC System 200 described in connection with FIGS. 2A-B. The method 300 may provide the user 210 with a UI (not shown) in step 304, through which the user 210 may submit a request to start, cancel, or modify a Job 238, Service or Reservation. As described in connection with the DUCC System 200, above, the UI presented in step 304 may be a CLI 212, an API 222a, one or more of which may be accessible by the user through a Web Server 222. Other embodiments of the invention may receive such requests from an automated source (i.e. a distinct method, system, or computer program product). In additional embodiments, such UIs may be offered by an entity distinct from the DUCC System 200 or one that implements the method 300.

In Step 308, the method 300 may orchestrate processing of the user 210 request to start, cancel, or modify a Job 238 (or Reservation or Service). Such requests and the Jobs 328 that they entail may be similarly defined as those described above in connection with the DUCC System 200 and its components (i.e., the Job 328 received by the method 300 may have a Collection Reader 242 and a plurality of pipelines 246, and have a state according to those defined in Tables 1-4). Orchestration of the request may include receiving the request from the user 210. It may further include deploying the corresponding Job 238 onto a set of selected nodes in the cluster of computing nodes, and managing processing of the Job 238 on those nodes. The selected nodes may include, for example, one or more of the Nodes 250. The determination of which Nodes 250 to select for processing Job 238 may depend on many factors assessed by the method 300 as described in greater detail, below. Furthermore, the method 300 may monitor the state of the Job 238 as it progresses through various possible states (from "Received" to "Completed"; see Tables 1-4), and may make the states available for later reference by step 308 or other steps of the method 300 or its processes.

In step 308, the method 300 may perform the following additional steps: it may publish and receive reports about its activities (such as Job 328 states; listing of active Jobs 328 and the Nodes 250 on which they are deployed, etc.) and present such reports in the OR-map 214a. The method 300 may receive user 210 requests to:

For a Job 238, {Start, Stop, Modify}

For a Reservation, {Start, Stop, Modify}

For a Service, {Start, Stop, Modify}

For an Individual Process, {Stop}

It may further receive status messages generated in other steps of the method 300, and advance the state machines of each Job 328 under its control. It may publish its reports at regular, configurable intervals and make them available to other steps of the method 300.

In step 308, the method 300 may also:

Authenticate users (as done by the Authenticator 214c module of the DUCC System 200);

Validate user requests (as done by the Validation 214d module of the DUCC System 200) against a set of criteria that define acceptableness;

Enter a state machine representation for each Job 328 (as done by the Factory 214e module of the DUCC System 200; see Tables 1-4, above), wherein the state information includes those described in connection therewith), including constructing a representation of the producer of work items (i.e. a Collection Reader 242) and a processor of work items (i.e. a pipeline(s) 246), and may facilitate user specification of pipelines 246 as a deployment descriptor or aggregate components (in the latter case, the method 300 may dynamically construct a deployment descriptor);

Supervise checkpointing, i.e. saving and restoring state information to/from persistent storage (as done by the Checkpoint Supervisor 214*f* module of the DUCC System 200);

Supervise states by receiving and examining publications by other steps of the method 300, and advance state machines accordingly (as done by the State Supervisor 214*g* module of the DUCC System 200);

Supervise state accounting and manage a finite state machine for the Jobs 328 (as done by the State Accounting Supervisor 214*h* module of the DUCC System 200);

Supervise and implement Linux Control Groups (as done by the Linux Control Group Supervisor 214*i* module of the DUCC System 200);

Supervise hosts, i.e. the Nodes 250 and the selected set thereof (as done by the Host Supervisor 214*j* module of the DUCC System 200);

Perform logging and "as-user" functions (as done by the Logging/As-User 214*k* modules of the DUCC System 200);

Perform administrative tasks (as done by the Administrators 214*l* module of the DUCC System 200); and Perform maintenance operations on the cluster of computing resources (as done by the Maintenance 214*m* module of the DUCC System 200).

With continued reference to FIGS. 2A-3, the method 300 may manage a plurality of constrained resources in the computing cluster, in step 312. According to an aspect of the disclosed invention, these constrained resources may be DUCC-Shares 262 in the DUCC System 200. Additionally, or alternatively, the constrained resources may include one or more of the following: Nodes 250, and attributes thereof, such as real memory, virtual memory, CPUs, cores, disk space, paging space, attached FPGAs, or other valuable and/or shareable entities. As part of its functionality in step 312, the method 200 may publish and receive reports (for example, those generated in step 308 and contained in the OR-map 214*a*) regarding the cluster and its resources, as well as the Jobs 238, Reservations or Services that require them, as well as agent publications. It may generate such reports at regular configurable intervals, each representing at the time of its publication, the desired allocation of resources (as determined in step 312). In making resource assignments/allocations, the method 300 may, in step 312, consider various factors, including: supply of available Nodes 250; memory size of each available Node 250; demand for resource in terms of memory size and class of service comprising Jobs 238, Reservations, or Services; and the most recent previous assignments and desirability for continuity.

In step 312, the method 300 may perform one or more of the following additional steps:

Receive an availability report for one or more of the Nodes 250 in the cluster;

Receive a resource needs request (for example, from a Job 328, while it is processed by step 308);

Assign or remove from a given Job 238 or sets of Jobs 238, one or more constrained resources, according to Job 238 classifications. The method 300 may determine job classification based on user 210 requests, subject to configurable class definitions. In making assignments or removals, the method 300 may also consider resource availability reports and resource needs requests generated in conjunction with other steps of the method 300.

In performing the above functions, the method 300 may, in step 312, perform the following supporting steps:

Receive publications generated in step 308's orchestration steps (as done by the Job Manager Converter 218*a* module of the DUCC System 200);

Determine Node 250 stability (as done by the Node Stability 218*b* module of the DUCC System 200);

Determine Node 250 status (as done by the Node Status 218*c* module of the DUCC System 200); and Perform scheduling steps (as done by the Scheduler 218*d* module of the DUCC System 200).

With continued reference to FIGS. 2A-3, the method 300 may also define services and reservations to support processing of the Jobs 238, as defined and described above in connection with the DUCC System 200, and process them as described therein. The functionality of Services and Reservations as described above may be implemented in any of the steps of the method 300 where Jobs 238 are defined, used, or processed. Such functionality may include providing a ping driver, service handler, service manager and API handler, and may generate and maintain an information registry of two types: service and meta. The service information may include the following attributes: classpath, description, environment, Java Virtual Machine (JVM), JVM args, log directory, deployment descriptor, failures limit, memory size, scheduling class, linger time, pinger classpath, pinger log, pinger timeout, service endpoint, and working directory. The meta information may include the following attributes: auto start, endpoint, implementers, instances (count), identifier (number), ping-active, ping-only, service-active, service-class, service-health, service-state, service-statistics, service-type, stopped, user, universally unique identifier (uuid) and work-instances (process identifier (PID) list).

With continued reference to FIGS. 2A-3, the method 300 may manage processing of the plurality of work items 252, in step 316. The managing function of step 316 may include monitoring and controlling one or more processes that support the analytic pipelines 246 of a Job 238 distributed over the selected Nodes 250. The method 300 may both publish and receive reports, available to or generated by other steps of the method 300, as described above in connection with the Process Manager 226 of the DUCC System 200. It may also facilitate functionality of Agents 258 (described in greater detail in the context of the method 300 in connection with step 320, below). More specifically, the method 300 may manage the distributed Agents 258, each of which manages Job Processes 264 in support of the one or more pipelines 246 running on a particular Node 250 to which the Agent 258, and the pipeline(s) 246 belong. The method 300 may also intercept reports generated in step 308 and distribute those reports to the Agents 258 which it manages. Among other functions, step 316 may direct the Agents 258 to bring the state of locally deployed Job Processes 264 into compliance with the orchestration directives determined in step 308.

With continued reference to FIGS. 2A-3, the method 300 may, in step 320, support functions of step 316 by generating an Agent 258 on each Node 250 in the set of selected Nodes 250 supporting processing of the Job(s) 238. Once generated in step 320, each Agent 258 may function as defined above, and in particular, as described in connection with the DUCC System 200, through one or more steps including:

Performing core Agent 258 operations (as done by the Core 258*a* module of the DUCC System 200);

Performing configuration operations (as done by the Config 258*b* module of the DUCC System 200);

Performing deployment operations (as done by the Deploy 258c module of the DUCC System 200);

Performing event handling (as done by the Event 258d module of the DUCC System 200);

Launching user 210 processes on the Node 250 where the Agent 258 is deployed (as done by the Launcher 258e module of the DUCC System 200);

Collecting Node 250 metrics (as done by the Metrics Collector 258f module of the DUCC System 200);

Monitoring various Job 238 states and triggering actions when specific evens occur (as done by the Monitor 258g module of the DUCC System 200); and Performing processing functions including assembling information for consideration by the method 300 when carrying out other Agent 258 duties and handling publications (as done b the Processors 258h module of the DUCC System 200).

With continued reference to FIGS. 2A-3, the method 300 may, in step 324, provide a plurality of Job Drivers 254 for each Job 238 to support processing of that Job 238. In providing the Job Driver 254, the method 300 may perform a variety of steps, including: fetching work items 252 to be processed by pipelines 246 of the corresponding Job 238, with a user-specified degree of parallelization; dispatching the fetched work items 252 to the appropriate pipelines 246 distributed among the selected set of Nodes 250 in the cluster; gathering and reporting on performance statistics of and errors encountered by the various steps of the method 300; retrying processing of failed but recoverable work items 252; and guaranteeing that individual work items 252 are not mistakenly simultaneously processed by more than one pipeline 246.

The Job Driver 254 provided in step 324 may include a container into which the user-specified Collection Reader 242 (a component of the Job 238) is deployed. The Job Driver 254 may interact with the Collection Reader 242 to fetch Common Analysis System (CAS) entities or work items 252 for processing by a corresponding pipeline 246. The Job Driver 254 may be deployed into a JD-Share allocated by the Resource Manager 218 and managed by a DUCC Agent 258 (for example, Agent A). These and other functions of step 324 may be performed through a series of additional steps, including:

Performing core steps, such as initializing the computing cluster to fetch and process work items 252 (as done by the Core 254a module of the DUCC System 200);

Perform client configuration and runtime steps (as done by the Client 254b module of the DUCC System 200);

Perform general configuration steps (as done by the Config 254c module of the DUCC System 200); and Perform event handling steps (as done by the Event 254d module of the DUCC System 200).

With continued reference to FIGS. 2A-3, the method 300 may process the first Job 238 and its work items 252 to completion, directing the resulting data to an Output Collection 268.

According to one example, a user 210 may submit a Job 238 to the method 300, the associated work items 252 of which may include a series of natural language questions, and a set of textual references (which may include, for example, one reference, or thousands of references). The Job 238 may also include a set of pipelines 246 that include user 210 provided code designed to parse the natural language questions and analyze them in the context of the included references, and produce an answer.

In the above example, the method 300 may receive the Job 238 request, along with any requests for Services or Reservations, in step 304 through a UI. The method 300 may orchestrate (in step 308) to which Nodes 250 in the computing cluster the Job 238 should be deployed, based on resource availability determined in step 312, deploy the Job 238 accordingly, and monitor and manage its processing by the other steps of the method. In step 316, the method 300 may deploy one or more processes 264 on each Node 250 where the pipelines 246 of the Job 238 are deployed, with these processes being managed by Agents 258 generated (and managed) in step 320. As the processing of the Job 328 continues, Job Drivers 254 allow the Collection Reader of the Job 238 to integrate with the DUCC functionality of the method 300 (or the DUCC System 200, as the case may be) to fetch work items 252, and dispatch the fetched work items 252 to the pipelines 246 through a Queue 266, for processing. In step 324, the method 300 may facilitate processing of the Input Collection 234, and direct the output of the method 300 to the Output Collection 268 (for example, this may be one or more answers to the natural language questions that the user 210 wished answered).

Referring now to FIG. 3 generally, it shall be apparent of one of ordinary skill in the art that the steps of the method 300 may be performed in series or concurrently, and that in either case, one step or parts thereof may be performed prior to or after other steps or parts thereof. The particular sequence in which these steps have been depicted is intended to present one aspect of the disclosed invention, but other aspects are expressly contemplated.

Figure 4:
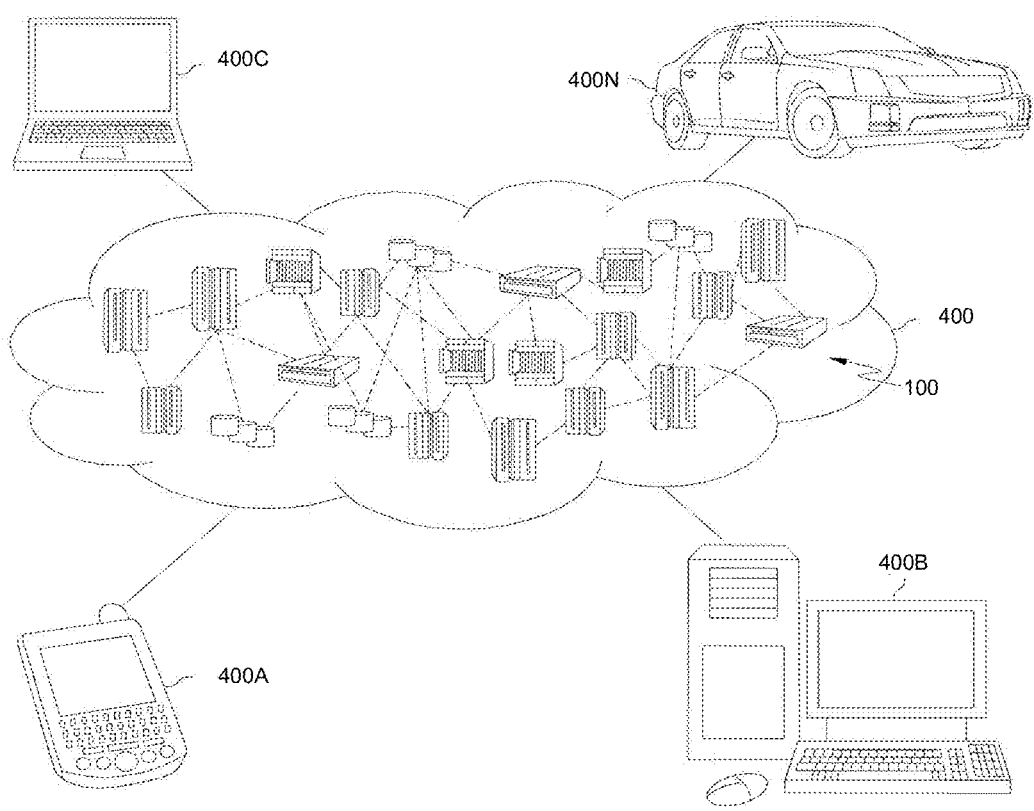
FIG. 4 is a schematic block diagram of an illustrative cloud computing environment, according to an aspect of the disclosed invention.

Referring now to FIG. 4, an illustrative cloud computing environment 400 is depicted. As shown, the cloud computing environment 400 comprises one or more cloud computing nodes, each of which may be a system 100 with which local computing devices used by cloud consumers, such as, for example, a personal digital assistant (PDA) or a cellular telephone 400A, a desktop computer 400B, a laptop computer 400C, and/or an automobile computer system 400N, may communicate. The nodes 100 may communicate with one another. They may be grouped (not shown) physically or virtually, in one or more networks, such as Private, Community, Public, or Hybrid clouds as described hereinabove, or a combination thereof. This allows the cloud computing environment 400 to offer infrastructure, platforms and/or software as services for which a cloud consumer does not need to maintain resources on a local computing device. It is understood that the types of computing devices 400A-N shown in FIG. 4 are intended to be illustrative only and that the computing nodes 100 and the cloud computing environment 400 can communicate with any type of computerized device over any type of network and/or network addressable connection (e.g., using a web browser).

Figure 5:
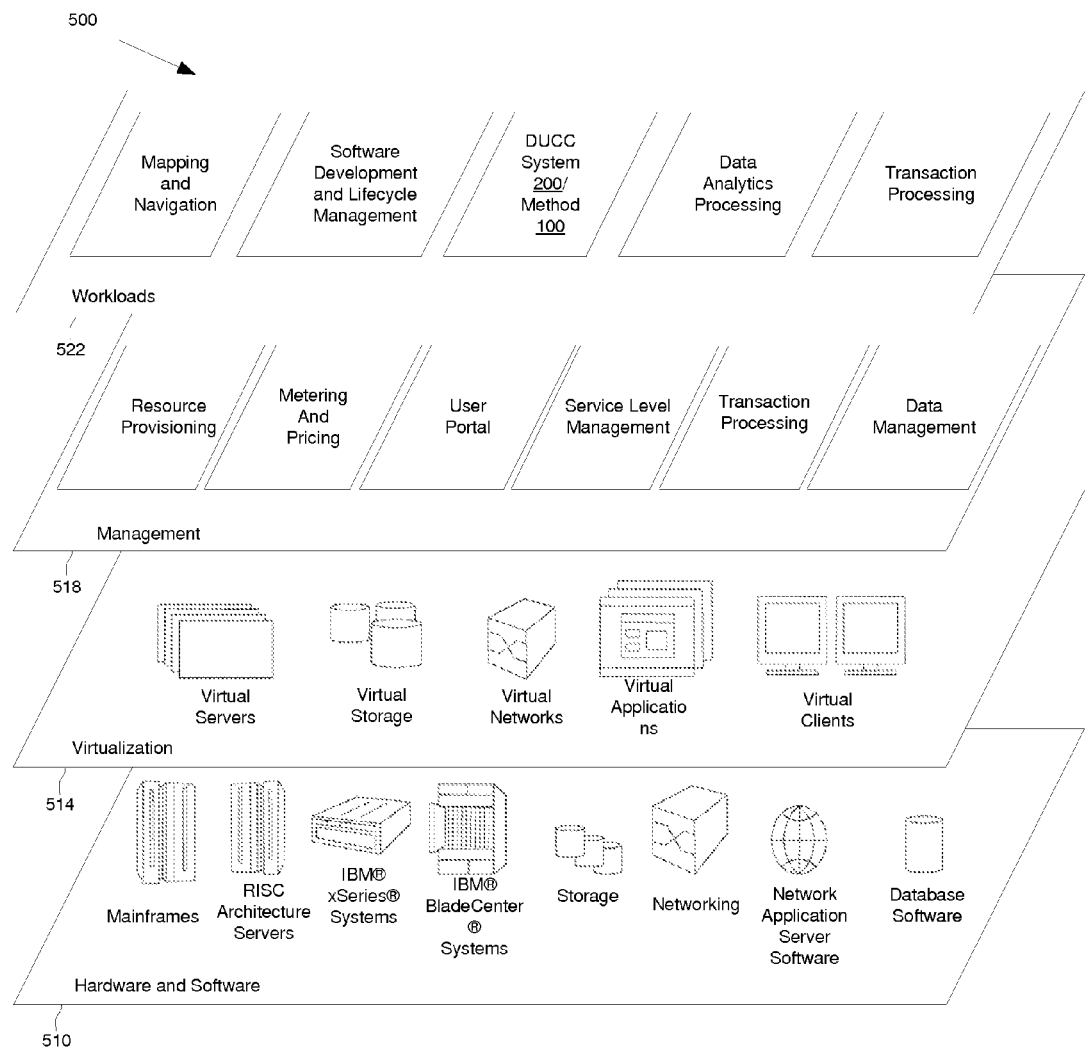
FIG. 5 is a multi-layered functional illustration of the cloud computing environment depicted in FIG. 4 according to an exemplary embodiment of the disclosed invention.

Referring now to FIG. 5, a set of functional abstraction layers provided by the cloud computing environment 500 (FIG. 4) is shown. It should be understood in advance that the components, layers, and functions shown in FIG. 5 are intended to be illustrative only and embodiments of the invention are not limited thereto. As depicted, the following layers and corresponding functions are provided.

The hardware and software layer 510 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

The virtualization layer 514 provides an abstraction layer from which the following examples of virtual entities may be provided: virtual servers; virtual storage; virtual networks, including virtual private networks; virtual applications and operating systems; and virtual clients.

In one example, the management layer 518 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

The workloads layer 522 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a DUCC analytics processing component, such as that provided for by the DUCC-System 200 or the method 300.

While the present invention is particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

We claim:

1. A method for processing analytics on a cluster of computing nodes, the method comprising:
   presenting, by a user interface module, to a user, a user interface to process job requests;
   receiving a first job request from the user;
   orchestrating by an orchestrator component, deployment and processing of the first job and a set of work items based on the first job request, the first job having a state and comprising a collection reader and a plurality of analysis engines,
   the orchestration further comprising:
      managing a set of processes;
      receiving a request from a user to process the first job and the set of work items;
         the first job having a state and comprising a collection reader and a plurality of analysis engines, wherein the collection reader comprises a user-supplied singleton work item supplier adapted to fetch a plurality of work items for processing, and wherein the plurality of analysis engines comprise user-supplied code adapted for analyzing the plurality of work items;
      deploying the first job onto a set of selected nodes comprising the first node and a plurality of additional nodes in the cluster for processing the first job;
      managing the processing of the first job; and
      monitoring the state of the first job and making the state accessible to the set of processes;
   managing, by a resource manager module, a plurality of constrained computing resources by allocating the plurality of constrained computing resources in the cluster of computing nodes for processing of the first job and a plurality of additional jobs and periodically receive information, from the orchestrator module, of the first job and the plurality of additional jobs;
   managing and controlling, by a process manager module, the plurality of analysis engines of the first job, and creating and terminating of a plurality of processes supporting the first job;
   generating, by an agent module, an agent for each node in the set of selected nodes, each agent deploys, monitors, and controls the execution of a plurality of processes supporting the first job on the node, and publishing a corresponding node inventory and a node metrics report;
   providing, by a plurality of job driver modules, a plurality of job drivers for the first job, the plurality of job drivers performing:
      1) connecting to the collection reader of the first job;
      2) fetching the set of work items of the first job in conjunction with the collection reader; and
      3) dispatching the fetched work items to the plurality of analysis engines of the first job for processing; and
   processing the first job and its work items.

2. The method of claim 1, further comprising:
   defining and managing a plurality of services supporting the first job and/or the plurality of additional jobs, the plurality of services having dependence and persistence properties.

3. The method of claim 2, wherein the plurality of services comprise a plurality of long-running processes and/or a plurality of pingers.

4. The method of claim 1, wherein the user interface is accessible through a web server and comprises a command line interface or an application program interface.

5. The method of claim 1, wherein managing the plurality of constrained computing resources further comprises:
   receiving an availability report for at least one of the computing nodes in the cluster;
   receiving a resource needs request;
   assigning or removing from the first job or the plurality of additional jobs, one or more of the plurality of constrained resources according to a scheduling class definition based on the resource availability report and the resource needs request.

6. The method of claim 1, wherein:
   the plurality of job driver modules are further configured as generic wrappers that in a configurable manner fetch work items of the first job; and
   deploying the first job onto the set of selected nodes by distributing a deployment descriptor, the deployment descriptor being user-specified or dynamically constructed.

7. The method of claim 1, wherein the orchestration further comprises implementing a fault-tolerant publication and subscription messaging mechanism for communication between the set of processes.

8. The method of claim 1, wherein the generated agent on each node comprises at least one instant virtual machine that modifies usage of the plurality of constrained computing resources by the node.

9. The method of claim 1, wherein generating an agent on each node further comprises:
   configuring and launching a monitor to detect unauthorized processes, the monitor reporting the unauthorized processes as part of the node metrics report and terminating the unauthorized processes.

10. The method of claim 1, wherein managing a plurality of constrained computing resources further comprises:
employing nodepools and classes to dynamically partition the plurality of constrained computing resources into virtual shares; and
assigning the partitioned virtual shares to the first job and/or the plurality of additional jobs according to a fair share scheduling method.

11. A system for processing analytics on a cluster of computing nodes, comprising:
a first node, the first node being a computer having a processor and a computer-readable storage device; and
a program embodied on the storage device for execution by the processor, the program having a plurality of program modules, the program modules including:
a user interface module configured to permit a user to request processing a job;
an orchestrator module configured to:
receive a request from the user to process a first job and a set of work items, the first job having a state and comprising a collection reader and a plurality of analysis engines, wherein the collection reader comprises a user-supplied singleton work item supplier adapted to fetch a plurality of work items for processing, and wherein the plurality of analysis engines comprise user-supplied code adapted for analyzing the plurality of work items;
deploy the first job onto a set of selected nodes comprising the first node and/or a plurality of additional nodes in the cluster for processing the first job, and
manage the processing of the first job; and
monitor the state of the first job and make the state accessible to the plurality of program modules;
a resource manager module, configured to allocate a plurality of constrained computing resources in the cluster for processing the first job and a plurality of additional jobs, and periodically receives information from the orchestrator module of the first job and the plurality of additional jobs;
a process manager module configured to monitor and control the plurality of analysis engines, and the creation and termination of a plurality of processes supporting the first job;
an agent module configured to generate an agent for the set of selected nodes where the first job is deployed, wherein each agent deploys, monitors and controls the execution of the plurality of processes supporting the first job, and publishes a corresponding node inventory report and a node metrics report; and
a plurality of job driver modules configured to:
1) connect to the collection reader of the first job;
2) fetch the set of work items of the first job; in conjunction with the collection reader; and
3) dispatch the fetched work items to the plurality of analysis engines of the first job for processing.

12. The system of claim 11, wherein the program modules further comprise a service manager module configured to define and manage a plurality of services supporting the first job and/or the plurality of additional jobs, the plurality of services having dependence and persistence properties.

13. The system of claim 11, wherein the user interface module is accessible through a web server and comprises a command line interface or an application program interface.

14. The system of claim 11, wherein the resource manager is further configured to:
receive a resource availability report from at least one of the agents;
receive a resource needs request from the orchestrator module; and
assign to or remove from the first job or the plurality of additional jobs one or more of the plurality of constrained resources according to a scheduling class definition based on the resource availability report and the resource needs request.

15. The system of claim 11, wherein:
the plurality of job driver modules are further configured as generic wrappers that in a configurable manner fetch work items of the first job; and
the orchestrator module is further configured to deploy the first job onto the set of selected nodes by distributing a deployment descriptor, the deployment descriptor being user-specified or dynamically constructed.

16. A computer program product for processing analytics on a cluster of computing nodes, comprising a non-transitory computer-readable storage medium having program code embodied therewith, the program code readable/executable by a processor of a computer to perform a the method comprising:
presenting, by a user interface module, to a user, by the processor, with a user interface to process job requests;
receiving a first job request from the user;
orchestrating by an orchestrator component, deployment and processing of the first job and a set of work items based on the first job request, the first job having a state and comprising a collection reader and a plurality of analysis engines,
the orchestration further comprising:
managing a set of processes;
receiving a request from a user to process the first job and the set of work items;
the first job having a state and comprising a collection reader and a plurality of analysis engines, wherein the collection reader comprises a user-supplied singleton work item supplier adapted to fetch a plurality of work items for processing, and wherein the plurality of analysis engines comprise user-supplied code adapted for analyzing the plurality of work items;
deploying the first job onto a set of selected nodes comprising the first node and a plurality of additional nodes in the cluster for processing the first job,
managing the processing of the first job; and
monitoring the state of the first job and making the state accessible to the set of processes;
managing, by a resource manager module, a plurality of constrained computing resources by allocating the plurality of constrained computing resources in the cluster of computing nodes for processing of the first job and a plurality of additional jobs and periodically receive information, from the orchestrator module, of the first job and the plurality of additional jobs;
managing, by the processor, and controlling, by a process manager module, the plurality of analysis engines of the first job, and creating and terminating of a plurality of processes supporting the first job;
generating, by an agent module, an agent for each node in the set of selected nodes, each agent deploys, monitors, and controls the execution of a plurality of processes supporting the first job on the node, and publishing a corresponding node inventory and a node metrics report;

providing, by the processor, by a plurality of job driver modules, a plurality of job drivers for the first job, the plurality of job drivers performing:
1) connecting to the collection reader of the first job;
2) fetching the set of work items of the first job in conjunction with the collection reader; and
3) dispatching the fetched work items to the plurality of analysis engines of the first job for processing; and
processing the first job and its work items.

17. The computer program product of claim 16, wherein the method further comprises:
defining and managing, by the processor, a plurality of services supporting the first job and/or the plurality of additional jobs, the plurality of services having dependence and persistence properties.

18. The computer program product of claim 16, wherein the user interface is accessible through a web server and comprises a command line interface or an application program interface.

19. The computer program product of claim 16, wherein managing the plurality of constrained computing resources, by the processor, further comprises:
receiving an availability report, by the processor, for at least one of the computing nodes in the cluster;
receiving, by the processor, a resource needs request; and
assigning or removing from the first job or the plurality of additional jobs, by the processor, one or more of the plurality of constrained resources according to a scheduling class definition based on the resource availability report and the resource needs request.

20. The computer program product of claim 16, wherein:
the plurality of job driver modules are further configured as generic wrappers that in a configurable manner fetch work items of the first job; and
deploying the first job onto the set of selected nodes by distributing a deployment descriptor, the deployment descriptor being user-specified or dynamically constructed.

* * * * *